United States Patent
Roy et al.

(10) Patent No.: US 10,719,355 B2
(45) Date of Patent: Jul. 21, 2020

(54) CRITICALITY BASED PORT SCHEDULING

(71) Applicant: Intel Corporation, Santa Clara, CA (US)

(72) Inventors: Pooja Roy, Bangalore (IN); Jayesh Gaur, Bangalore (IN); Sreenivas Subramoney, Bangalore (IN); Zeev Sperber, Zichron Yackov (IL); Alexandr Titov, Severodvinsk (RU); Lihu Rappoport, Haifa (IL); Stanislav Shwartsman, Haifa (IL); Hong Wang, Santa Clara, CA (US); Adi Yoaz, Hof HaCarmel (IL); Ronak Singhal, Portland, OR (US); Robert S. Chappell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 15/890,984

(22) Filed: Feb. 7, 2018

(65) Prior Publication Data
US 2019/0243684 A1 Aug. 8, 2019

(51) Int. Cl.
*G06F 9/48* (2006.01)
*G06F 9/38* (2018.01)

(52) U.S. Cl.
CPC ............ *G06F 9/4881* (2013.01); *G06F 9/384* (2013.01); *G06F 9/3855* (2013.01); *G06F 9/3887* (2013.01)

(58) Field of Classification Search
CPC ...... G06F 9/4881; G06F 9/3887; G06F 9/384; G06F 9/3855; G06F 9/4818
See application file for complete search history.

(56) References Cited

U.S. PATENT DOCUMENTS

| | | | | |
|---|---|---|---|---|
| 6,021,425 A * | 2/2000 | Waldron, III | ......... | G06F 9/4881 718/103 |
| 6,105,128 A * | 8/2000 | Hathaway | ............. | G06F 9/3836 712/215 |
| 6,697,932 B1 * | 2/2004 | Yoaz | ..................... | G06F 9/3824 712/216 |
| 7,032,101 B2 * | 4/2006 | Gschwind | ............. | G06F 9/3836 712/207 |
| 9,928,183 B2 * | 3/2018 | Svendsen | ................ | G06F 13/18 |
| 2004/0172631 A1* | 9/2004 | Howard | ............. | G06F 9/30087 718/100 |

(Continued)

OTHER PUBLICATIONS

Eric Tune et al., "Dynamic Prediction of Critical Path Instructions", Dept. of Computer Science and Engineering, University of California, San Diego, In Proceedings of the 7th International Symposium on High Performance Computer Architecture (HPCA 2001), 11 pages.

(Continued)

*Primary Examiner* — Benjamin C Wu
(74) *Attorney, Agent, or Firm* — Lowenstein Sandler LLP

(57) ABSTRACT

A processor including an execution unit, an instruction scheduler circuit to identify a first instruction of an instruction stream, identify a second instruction on which execution of the first instruction depends, and assign a first dispatch priority value to the first instruction and the second instruction, and a dispatch circuit to dispatch, based on the first dispatch priority value, the first instruction and the second instruction to an instruction execution circuit.

20 Claims, 12 Drawing Sheets

(56) References Cited

U.S. PATENT DOCUMENTS

2007/0074217 A1* 3/2007 Rakvic ................. G06F 9/3009
                                                    718/102
2009/0260013 A1* 10/2009 Heil .................... G06F 15/7825
                                                    718/103
2016/0378470 A1* 12/2016 Yasin ................... G06F 9/3836
                                                    712/208

OTHER PUBLICATIONS

Brian Fields et al., "Focusing Processor Policies via Critical-Path Prediction", Computer Sciences Department, University of Wisconsin-Madison, Proceedings of the 28th Annual International Symposium on Computer Architecture (ISCA 2001), 12 pages.

* cited by examiner

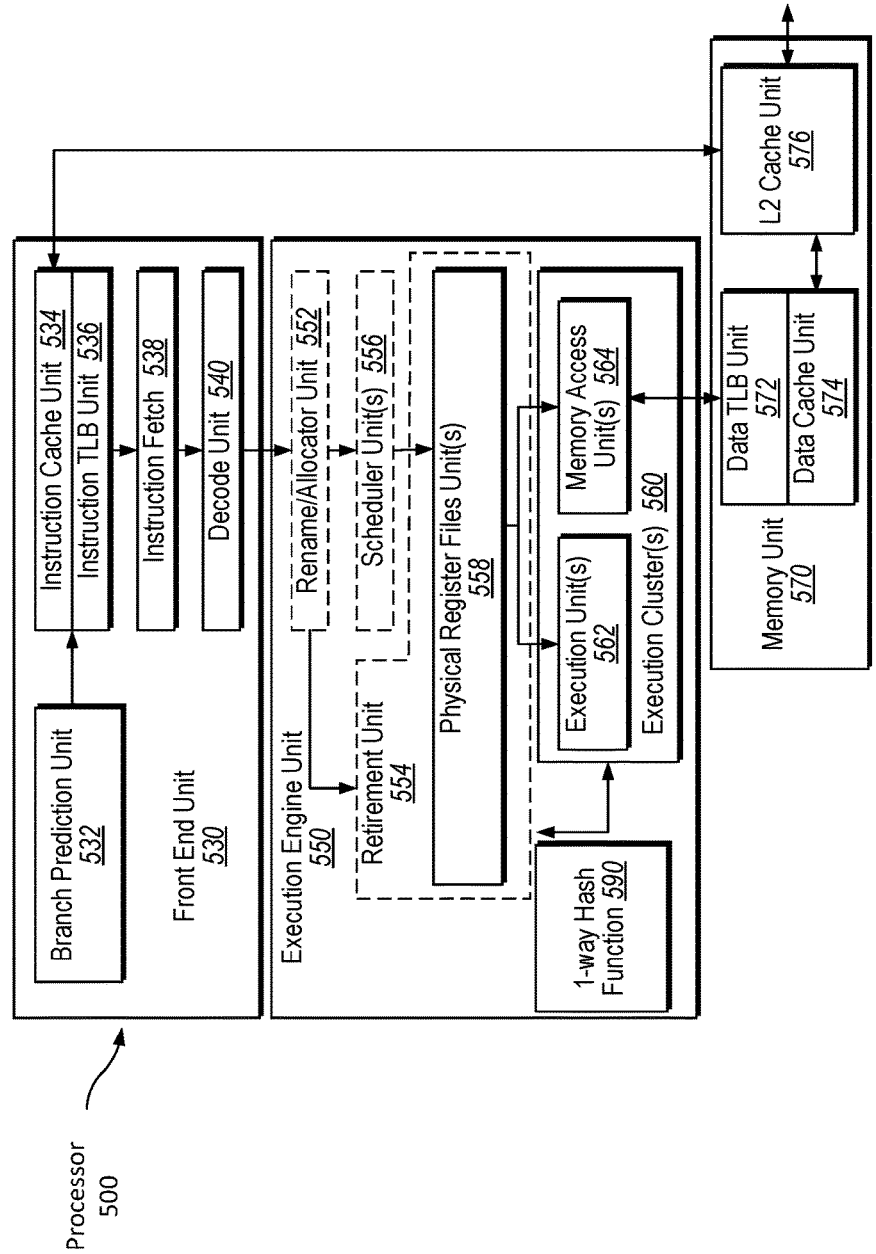
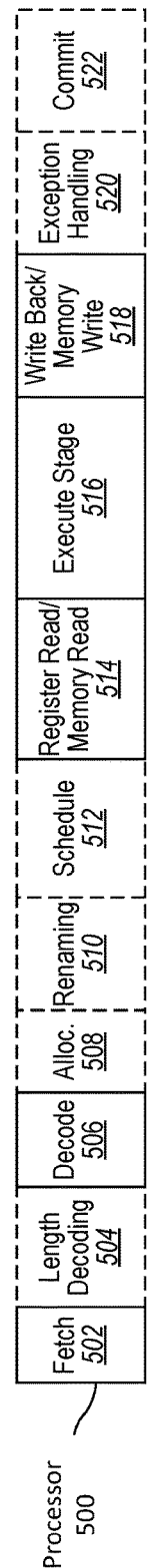

CRITICALITY BASED PORT SCHEDULING

TECHNICAL FIELD

Embodiments of the disclosure relate generally to microprocessors and more specifically, but without limitation, to a microprocessor including a scheduler circuit to schedule instruction dispatches in out-of-order (OOO) instruction execution.

BACKGROUND

Multi-core processors are found in most computing systems today, including servers, desktops and a System on a Chip (SoC). Computer systems that utilize these multi-core processors may execute instructions of programs.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5A is a block diagram illustrating a micro-architecture for a processor including heterogeneous core in which one embodiment of the disclosure may be used.

FIG. 5B is a block diagram illustrating an in-order pipeline and a register renaming stage, out-of-order issue/execution pipeline implemented according to at least one embodiment of the disclosure.

DETAILED DESCRIPTION

Figure 1:
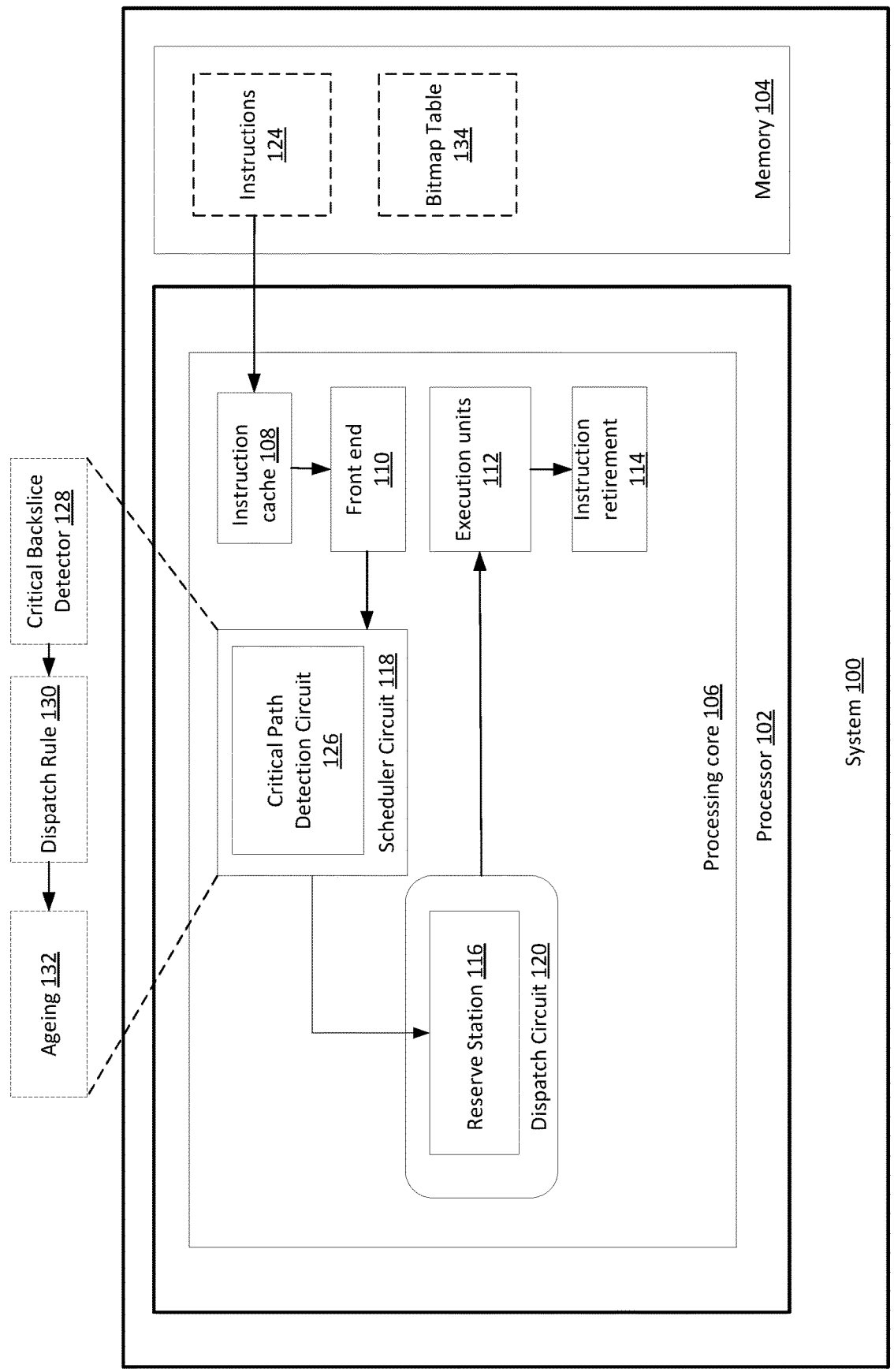
FIG. 1 illustrates a processing system according to an embodiment of the present disclosure.

A processor may execute an instruction stream encoding a software application. The instruction stream may include branches. The execution of a particular branch may depend on whether a condition is met during the execution. The condition can be a comparison of an input value and another pre-determined value. The evaluation of a condition may determine which one of a number of branches of instructions be executed.

To increase the speed of instruction execution, the processor may allow out-of-order instruction execution. The processor may include a branch prediction circuit that may predict which branch is most likely to be executed and cause the execution of the predicted branch ahead of the actual evaluation of the condition associated with the branch. If the predicted condition in later actual execution of instructions turns out to be true, the performance of the processor is improved because the branch of instructions has already been executed in advance. If the predicted condition turns out to be false, the state of the processor (e.g., values stored in registers of the processor) needs to be rolled back to the state prior to the branch prediction and the branch of instructions identified by the evaluated conditional value needs to be executed. These rollbacks represent the penalty associated with branch predictions. Certain types of branches in the instruction stream are hard to predict correctly. For example, it is hard to predict the value read from memory location because the value stored at the memory location can be random. When such a value is used in a comparison instruction, the outcome of the comparison is also hard to predict. Wrong predictions of these hard-to-predict branches in the instruction stream may cause a large performance penalty to the processor performance. In some implementations, these hard-to-predict instructions (and instructions that may cause long delays in the instruction execution pipeline) are referred to as critical instructions. These critical instructions can be identified by different approaches including such as, for example, dynamic critical instruction prediction (e.g., using critical path prediction buffer or critical path marking), and policy-based critical instruction prediction (e.g., using a dependence-graph model).

For an out-of-order instruction execution processor, at any clock cycle, there may be a pool of micro-operations (uops) waiting to be dispatched to an available execution unit. In some implementations, the scheduler circuit of the processor may dispatch the waiting micro-operations based on the time they have been in the pool waiting for dispatch to an execution unit. Although the instruction allocation is in-order, the dispatch of instructions can be whenever an instruction is ready to be dispatched. The waiting time is referred to as the age of the micro-operation. The scheduler circuit may dispatch micro-operations according the ages starting from the oldest. The age-based scheme, however, fails to take into consideration the impacts for executing critical instructions in the waiting pool. An earlier execution of critical instructions may help improve processor performance.

In some implementations, the scheduler circuit may first use a critical instruction detection method to identify critical instructions from the instruction stream and assign a high dispatch priority value to the critical instructions. The scheduler circuit may also assign a low dispatch priority value to non-critical instructions from the instruction stream. The dispatcher circuit may then dispatch instructions based on the dispatch priority value to execution units.

Because the execution of a critical instruction may rely upon the results of other instructions. For example, the critical instruction may reference a source register as the input value, where the value stored in the source register is generated by executing another instruction (referred to as the feeder instruction). The feeder instruction can be a critical instruction or a non-critical instruction. Thus, only prioritization of the execution of the critical instructions may not necessarily help improve processor performance because the non-critical instruction may have yet supply the data on which the execution of the critical instruction relied upon. For example, a critical instruction may read from a value stored in a register, where the value stored in the register is supplied by executing a feeder instruction. Embodiments of the present disclosure provide a scheduler circuit that may identify a critical instruction and one or more feeder instructions (referred to as the backslice of the critical instruction) on which the critical instruction depends. The scheduler circuit may assign high priority value to the critical instruction and to the backslice of the critical instruction. The scheduler circuit may then prioritize dispatching the critical instruction and its backslice to an execution unit for out-of-order execution, thus improve the processor performance FIG. 1 illustrates a processing system 100 according to an embodiment of the present disclosure. As shown in FIG. 1, processing system 100 (e.g., a system-on-a-chip (SOC) or a motherboard of a computer system) may include a processor 102 and a memory device 104 communicatively coupled to processor 102. Processor 102 may be a hardware processing device such as, for example, a central processing unit (CPU) or a graphic processing unit (GPU) that includes one or more processing cores to execute software applications.

Processor 102 may further include processing core 106 which, in various implementations, may be capable of in-order cores or out-of-order execution of instructions. In an illustrative example, processing core 106 may have a micro-architecture including processor logic and circuits used to implement an instruction set architecture (ISA). Processors 102 with different micro-architectures can share at least a portion of a common instruction set. For example, the same register architecture of the ISA may be implemented in different ways in different micro-architectures using various techniques, including dedicated physical registers, one or more dynamically allocated physical registers using a register renaming mechanism (e.g., the use of a register alias table (RAT), or a re-order buffer (ROB) and a retirement register file).

Referring to FIG. 1, processing core 106 may further include an instruction cache 108, a front end circuit 110, an execution circuit 112, and an instruction retirement circuit 114. Processing core 106 may also include a register file including a scheduler circuit 118 and a dispatcher circuit 120. These components are described in the following sections in detail.

Instruction cache circuit 108 may receive instructions from a memory area 124 using an instruction fetch circuit (not shown) and store instructions retrieved in an instruction cache of processing core 106. The retrieved instructions can be in a sequence (referred to as an instruction stream) that can be executed out of order for execution optimization. An exemplary architecture of front end circuit 110 is shown in FIG. 5A as front end unit 530 and in FIG. 6 as front end 601.

In one embodiment, the instruction stream in the pool waiting for out-of-order execution may include one or more micro-operations, micro-code entry points, microinstructions, other instructions, or other control signals (collectively referred to as "micro-operations"), which are decoded from, or which otherwise reflect, or are derived from, the original instructions. Front end circuit 110 may place the micro-operations received from instruction cache circuit in a pool of micro-operations waiting for out-of-order execution by execution unit 112.

Scheduler circuit 118 may identify the micro-operations in the pool waiting for out-of-order execution and assign these micro-operations with dispatch priority values. The dispatch priority values associated with the micro-operations may determine the order in which micro-operations are retrieved from the pool and dispatched to execution unit 112. In one embodiment, scheduler circuit 118 may further include a critical path detection circuit 126 for detecting critical instructions and their corresponding backslices. A critical instruction is an instruction that can cause an excessive delay in out-of-order instruction execution of a chain of instructions (referred to as a critical path). The delay of the execution of the critical path may be manifested as an excessive delay in the retirement of these instructions. In one example, the critical instruction can be a branch instruction (e.g., a conditional jump instruction (jns)) that, if mispredicted, causes many clock cycles (e.g., 50 clock cycles) of delay in execution of a chain of micro-operations that depends on the branch instruction. In another example, the critical instruction can be a long-latency instruction (e.g., a load instruction (movl or movq)) that may require many clock cycles (e.g., 70 clock cycles) to retrieve the data from the memory if there is a cache miss. It is advantageous to identify and dispatch these critical instructions early (i.e., ahead of non-critical instructions in the critical path) to improve the overall throughput of the processor performance For example, micro-operations A, B, C may require 200, 5, 5 clock cycle, respectively, to execute. If micro-operation A incurs a delay of 50 clock cycles, micro-operation A is a critical instruction because a delay to micro-operation A causes large delays to instructions B and C, where the delays to instructions B and C can be avoided if instruction A was executed earlier. The backslice of the critical instruction can include the set of micro-operations that the execution of the critical instruction depends on. Critical path detection circuit 126 may identify a critical instruction and its backslice in real time (e.g., using a bitmap as described later in detail) and assign a high dispatch priority value to the critical instruction and its backslice. Further, scheduler circuit 118 may place the critical instruction and micro-operations in its backslice into reserve station 116 based on the dispatch priority value.

In one embodiment, the reserve station 116 may include a set of registers to hold the pool of micro-operations waiting to be dispatched by dispatcher circuit 120. Each micro-operation may be associated with a dispatch priority value. In one embodiment, the higher dispatch priority value may indicate an earlier dispatch by the dispatcher circuit 120 to execution unit 112 when the execution unit 112 is available. As described above, a critical instruction and the micro-operations are assigned with a priority dispatch value higher than those of non-critical instructions. Thus, dispatcher circuit 120 may dispatch critical instructions and micro-operations in its backslice earlier than those non-critical instructions. In one embodiment, the micro-operations in the backslice may be dispatched to an execution unit different than the execution unit to execute the critical instruction.

One or more execution units 112 may include logic circuits to execute micro-operations in an out-of-order fashion. An execution unit 112 may be in a state of "being executing micro-operations" or in a mode of "available to receive micro-operations for execution." Responsive to detecting that there are execution units 112 available to receive micro-operations for execution, dispatcher circuit 116 may dispatch, using a dispatch rule, the micro-instructions in reserve station 116. In one embodiment, the dispatch rule may specify that a micro-operation associated with a higher dispatch priority value is dispatched to an execution unit 112 earlier than another micro-operation associated with a lower dispatch priority value. Further, the dispatch rule may specify that a critical instruction and the micro-operations of its backslice are dispatched together to a same execution unit, allowing the execution to execute the micro-operations in the backslice ahead of the critical instruction.

Execution units 112 may include logic circuits implemented according to an instruction set architecture (ISA) to execute micro-operations. In one embodiment, processing core 106 may include multiple execution units 112 that each may execute one or more micro-operations. In one embodiment, execution units 112 may execute the received instruction stream in an out-of-order fashion to gain performance improvements. After an execution unit 112 has completed the execution of all instructions assigned to the execution unit, the execution unit is available to receive a new instruction for execution.

Processing core 106 may further include an instruction retirement circuit 114 to reclaim physical registers used by instructions that are done for execution. The retirement of physical registers makes these registers available for other instructions.

Critical path detection circuit 126 may implement a critical backslice detector circuit 128 to identify the backslice associated with a critical instruction. In one embodiment, critical backslice detector circuit 128 may use a bitmap table 134 to monitor the architectural registers specified in the ISA of processor 102. The architectural registers contain all the logical registers defined in the ISA which are commonly fewer than the physical registers available in processor 102. The bitmap table 134 can be a table data structure stored in memory 104 that can be used to identify the backslice of the critical instruction.

Figure 2:
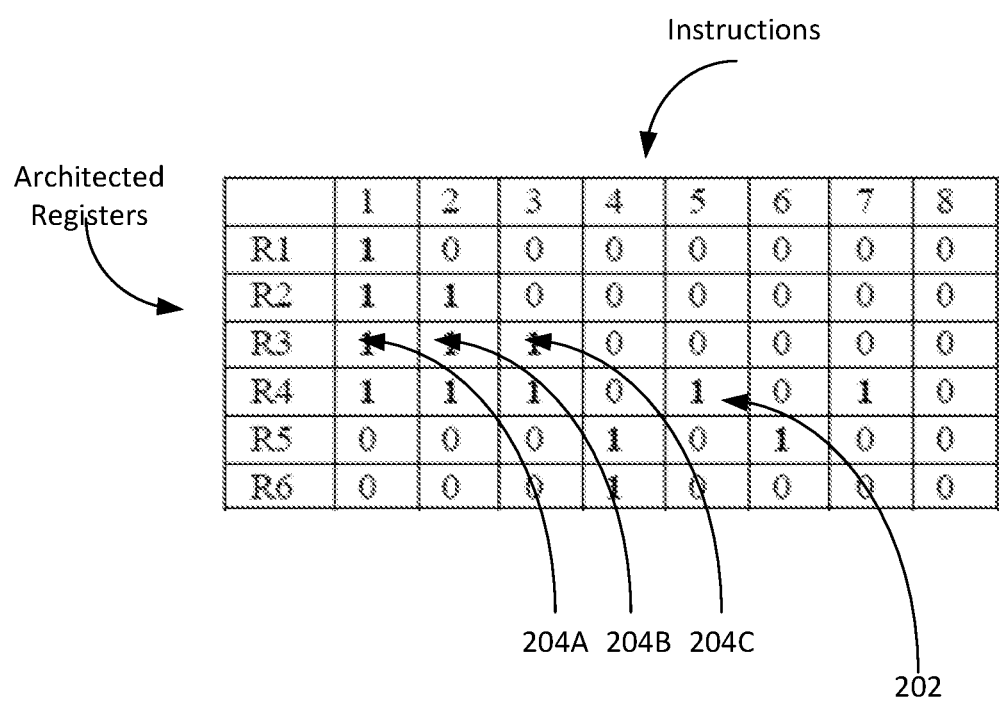
FIG. 2 illustrates an exemplary bitmap table used for identifying a backslice of a critical instruction according to an embodiment of the present disclosure.

FIG. 2 illustrates an exemplary bitmap table 200 stored in memory 104 used for identifying the backslice according to an embodiment of the present disclosure. Bitmap 200 can be one exemplary bitmap table (one of bitmap tables 134 as shown in FIG. 1) corresponding to the program illustrated in Table 1 which is provided herein for illustrative purpose. As shown in FIG. 2, bitmap table 200 is a two-dimensional table, where each of the rows represents a corresponding architectural register specified in the ISA of processor 102, and each of the columns represents a corresponding instruction received for out-of-order execution by processing core 106. Table 200 may include cells that are identified by their corresponding row numbers and column numbers. Each cell may store a logical value ("1" indicating "related" or "0" indicating "unrelated") indicating whether the execution of a corresponding instruction relates to an architectural register. For example, cell 202 identified by row 4 (corresponding to register R4) and column 5 (instruction #5) contains a "1" value, indicating that instruction #5 of Table relates to register R4.

Critical path detection circuit 126 may set the value stored in cells of a bitmap table as follows. The instructions are ordered sequentially according to their arrival time. Each instruction may read from one or more architectural registers (referred to as source registers) and write the results to one or more architectural registers (referred to as the destination registers). For each column (e.g., the corresponding instruction for column 5 is "move r3 r4"), critical path detection circuit 126 may identify the source registers (R3) and a destination register (R4). Critical path detection circuit 126 may identify a cell 202 corresponding to the destination register and store a value "1" to cell 202. Further, critical path detection circuit 126 may perform an OR operation for the source registers corresponding to that row. Within the row, the positions that are set to "1" may indicate that the corresponding micro-operations are included in the backslice (or the set of the source registers) to the critical micro-operation. To identify the backslice of a critical instruction (e.g., if instruction 5 is identified as critical), critical path detection circuit 126 may search for the row corresponding to its source register (R3) of the critical instruction and identify related cells (204A-204C). The backslice is composed of instructions (instructions 1-3) associated with "1" cells 204A-204C. Critical path detection circuit 126 may increase the size of bitmap table 200 as the instructions arrive at the processing core for execution (add one column on the right for each arriving instruction) and decrease the size as the instructions are flushed when the speculation execution concludes (remove a column if the corresponding instruction retires).

For illustration purpose, Table 1 is an exemplary set of instructions that matches the bitmap table 200.

TABLE 1

1. Load %(rsp) r1
2. Add r1 r2
3. Load %(r2) r3
4. Add 0x1 r6
5. Mov r3 r4
6. Add r6 r5
7. Mul r3 r4
8. Store r4 % 0x8(rsp)

For illustration purpose, for example, to calculate the backslice for instruction 5, critical path detection circuit 126 may determine that the destination register is R4 and set the cell 202 corresponding to R4 to "1," where the source register R4 may be defined as specified in the ISA of the processor. Further, as described above, critical path detection circuit 126 may identify the source register R3 and determine that the source register R3 relates to instruction 3 (which may relate to instruction 2 and rely on register R2, and which may in turn relate to instruction 1 and rely on register R1). Thus, the backslice include instructions 1-3 for instruction 5.

Although the bitmap table 200 can be used to determine backslice of an instruction in real time, it is understood that the above-described method is an exemplary approach to determine the backslice. Other methods can also be used to identify the backslice of a critical instruction.

In one embodiment, critical path detection circuit 126 may calculate and associate a first dispatch priority value (a high value) to the detected critical instruction and the backslice of the critical instruction. Further, critical path detection circuit 126 may calculate and associate a second dispatch priority value (a low value) to detected non-critical instructions that are not part of any backslice of critical instructions. Dispatch circuit 120 may dispatch instructions using a dispatch rule 130. In one embodiment, in addition to the dispatch priority value associated with the instructions, dispatch rule 130 may determine the order to dispatch instructions based on the ages of these instructions. The age of an instruction is specified by the time that instruction cache circuit 108 fetches the instruction from memory 104. The longer an instruction has been fetched, the older the instruction is. Thus, dispatch rule 130 may specify that an instruction associated with a higher dispatch priority value is dispatched earlier than an instruction with lower dispatch priority value. But for instructions associated with a same dispatch priority values, dispatch rule 130 may specify that dispatch circuit 120 may dispatch older instructions earlier than younger instructions.

Certain non-critical instructions can stay in reserve station 116 for a very long time without being dispatched because critical patch detection circuit 126 may keep receiving and identifying critical instructions that take dispatch priority over non-critical instructions. The non-critical instruction would be stalled and take a long time to be dispatched to execution units. These non-critical instructions may create new critical paths that delay the execution of the program. To avoid such situation, embodiments of the present disclosure may also provide an ageing mechanism 132 to accelerate the dispatch of old non-critical instructions. In one embodiment, for example, critical path detection circuit 126 may detect that the age of a non-critical instruction in reserve station 116 has exceeded a threshold value (e.g., a pre-determined time period or a pre-determined numbers of processor clock cycles). In response, critical path detection circuit 126 may update the dispatch priority value associated with the instruction to a high dispatch priority value, thus effectively converting the instruction to a critical status which may lead to a quick dispatch.

Figure 3:
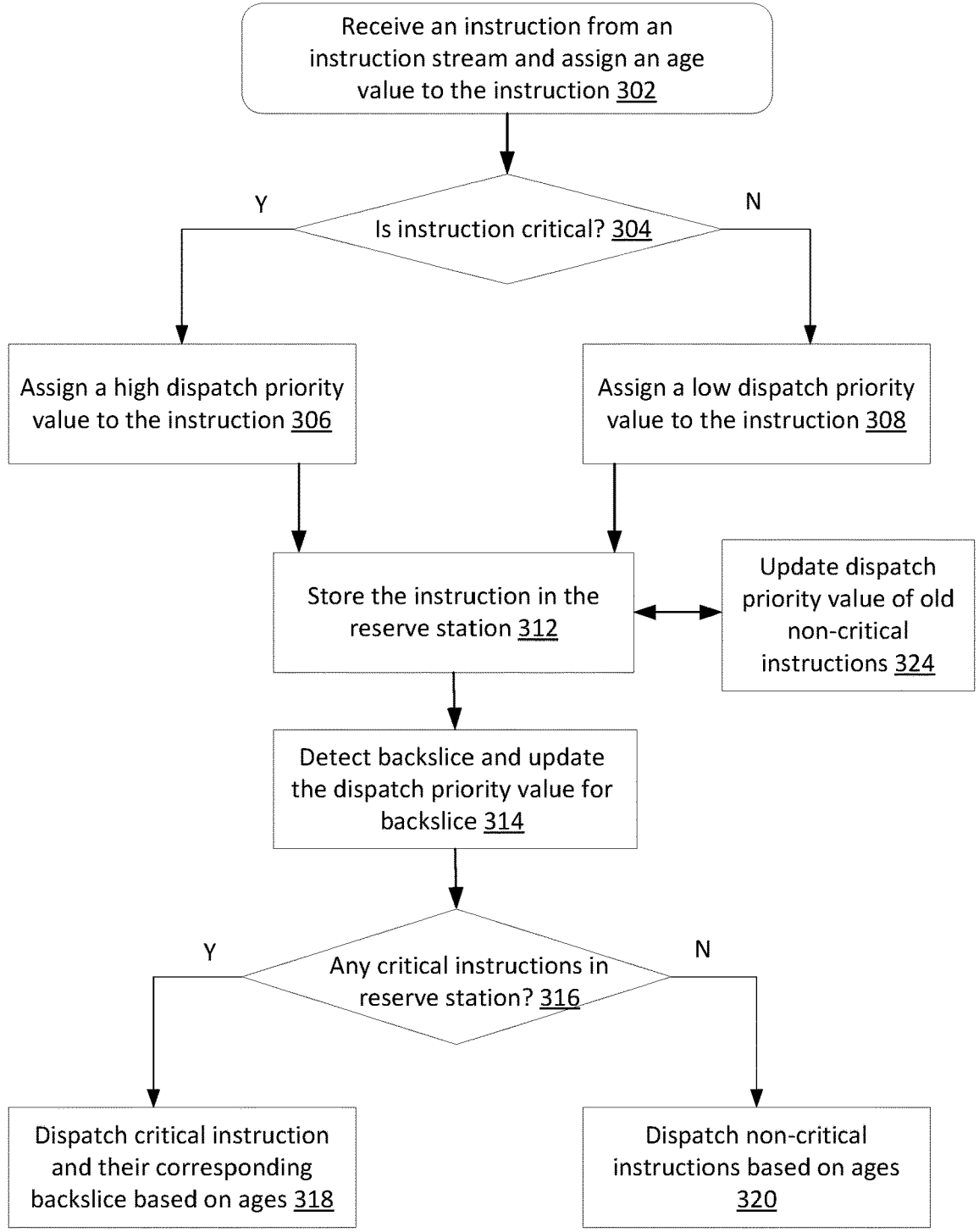
FIG. 3 illustrates a life cycle of instruction dispatch according to an embodiment of the present disclosure.

FIG. 3 illustrates a life cycle 300 of instructions according to an embodiment of the present disclosure. At 302, critical path detection circuit 126 may receive an instruction from an instruction stream and assign an age value to the instruction, where the age value can be the time of the instruction received by critical path detection circuit 126.

At 304, critical path detection circuit 126 may, based on a critical instruction detection algorithm, determine whether the instruction is a critical instruction. Responsive to determining that the instruction is a critical instruction, at 306, the critical path detection circuit 126 may assign a high dispatch priority value to the instruction, and further at 312, store the instruction in reserve station 116 in the pool of instructions waiting for dispatching. Responsive to determining that the instruction is a non-critical instruction, at 308, the critical path detection circuit 126 may assign a low dispatch priority value to the instruction, and further at 312, store the instruction in reserve station 116 in the pool of instructions waiting for dispatching.

At 314, critical path detection circuit 126 may identify the backslice for the critical instruction, and responsive to identifying any micro-operations in the backslice, assign the high dispatch priority value to these micro-operations. The backslice may include non-critical instructions in reserve station 116.

At 316, dispatch circuit 120 may determine whether there are critical instructions in reserve station 116. Responsive to determining that there are critical instructions in reserve station 116 waiting for dispatching, at 318, dispatch circuit 120 may dispatch critical instructions and their corresponding backslice to available execution units. In an alternative embodiment, the detection of backslice of the critical instruction may occur at the time a critical instruction is scheduled to dispatch, thus increasing the chance to detect late arrival micro-operations in the backslice. The order of dispatching critical instructions (and their backslice) may be based on the ages of the critical instructions (e.g., older critical instructions are dispatched earlier). Responsive to determining that there are no critical instructions in reserve station 116 waiting for dispatching, at 320, dispatch circuit 120 may dispatch non-critical instructions to available execution units. The order of dispatching non-critical instructions may be based on the ages of the non-critical instructions (e.g., older non-critical instructions are dispatched earlier).

At 324, critical path detection circuit 126 may also monitor the time of non-critical instructions have stayed in reserve station 116. Responsive to detecting any non-critical instructions have stayed there for a time exceeding a threshold value, critical path detection circuit 126 may assign a high dispatch priority value to these instructions.

Figure 4:
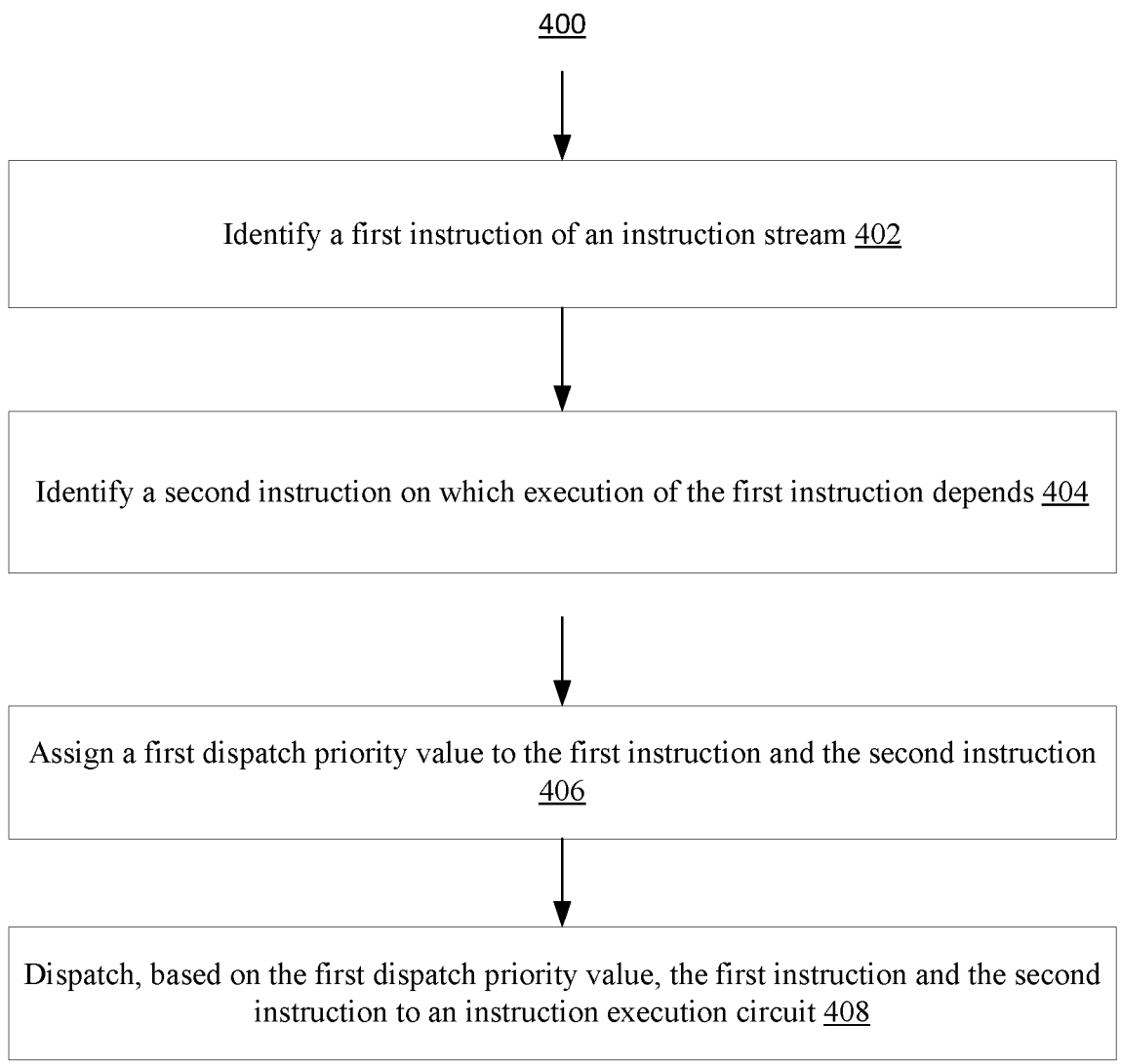
FIG. 4 is a block diagram of a method for for scheduling the dispatch of an instruction and its backslice according to an embodiment of the present disclosure.

FIG. 4 is a block diagram of a method 400 for scheduling the dispatch of instructions according to an embodiment of the present disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processor 102 and processing core 106, as shown in FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, the processor may include logic circuits to perform operations.

At 402, the processor may identify a first instruction of an instruction stream.

At 404, the processor may identify a second instruction on which execution of the first instruction depends.

At 406, the processor may assign a first dispatch priority value to the first instruction and the second instruction.

At 408, the processor may dispatch, based on the first dispatch priority value, the first instruction and the second instruction to an instruction execution circuit.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 102 described with respect to FIG. 1. In particular, processor 500 may include processing core 106 as shown in FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processor 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor 500 as a pipeline includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
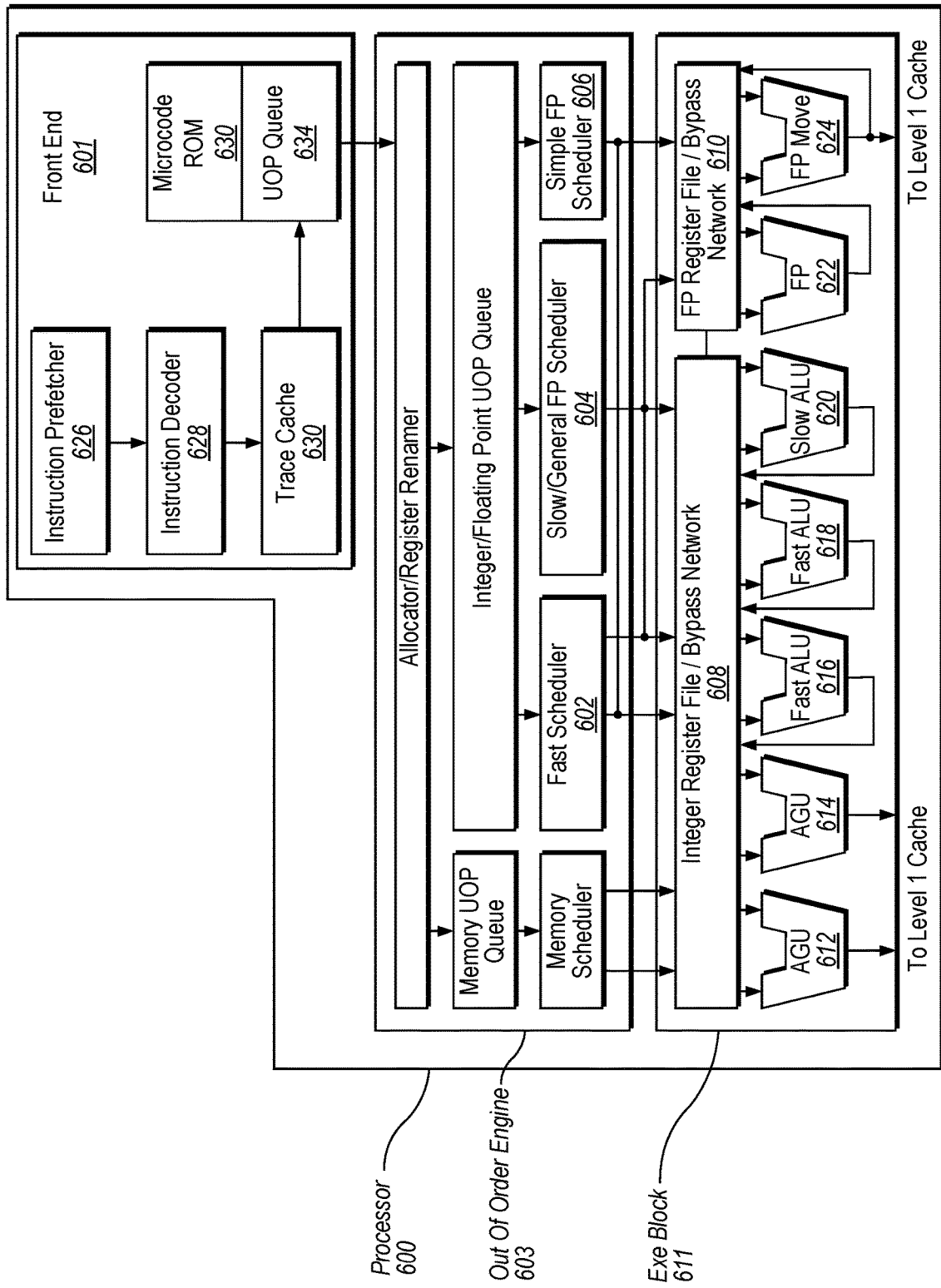
FIG. 6 illustrates a block diagram of the micro-architecture for a processor that includes logic in accordance with one embodiment of the disclosure.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
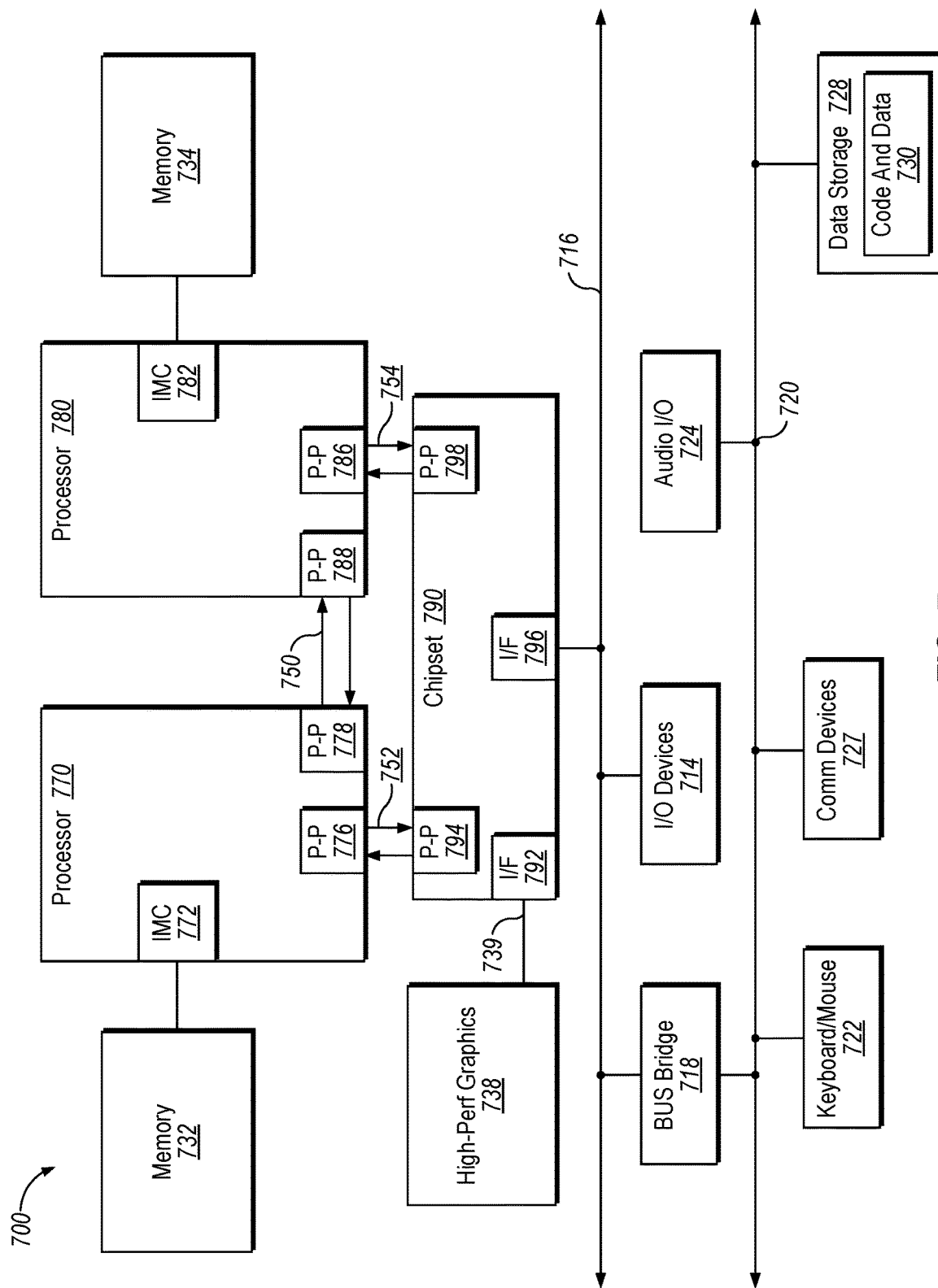
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
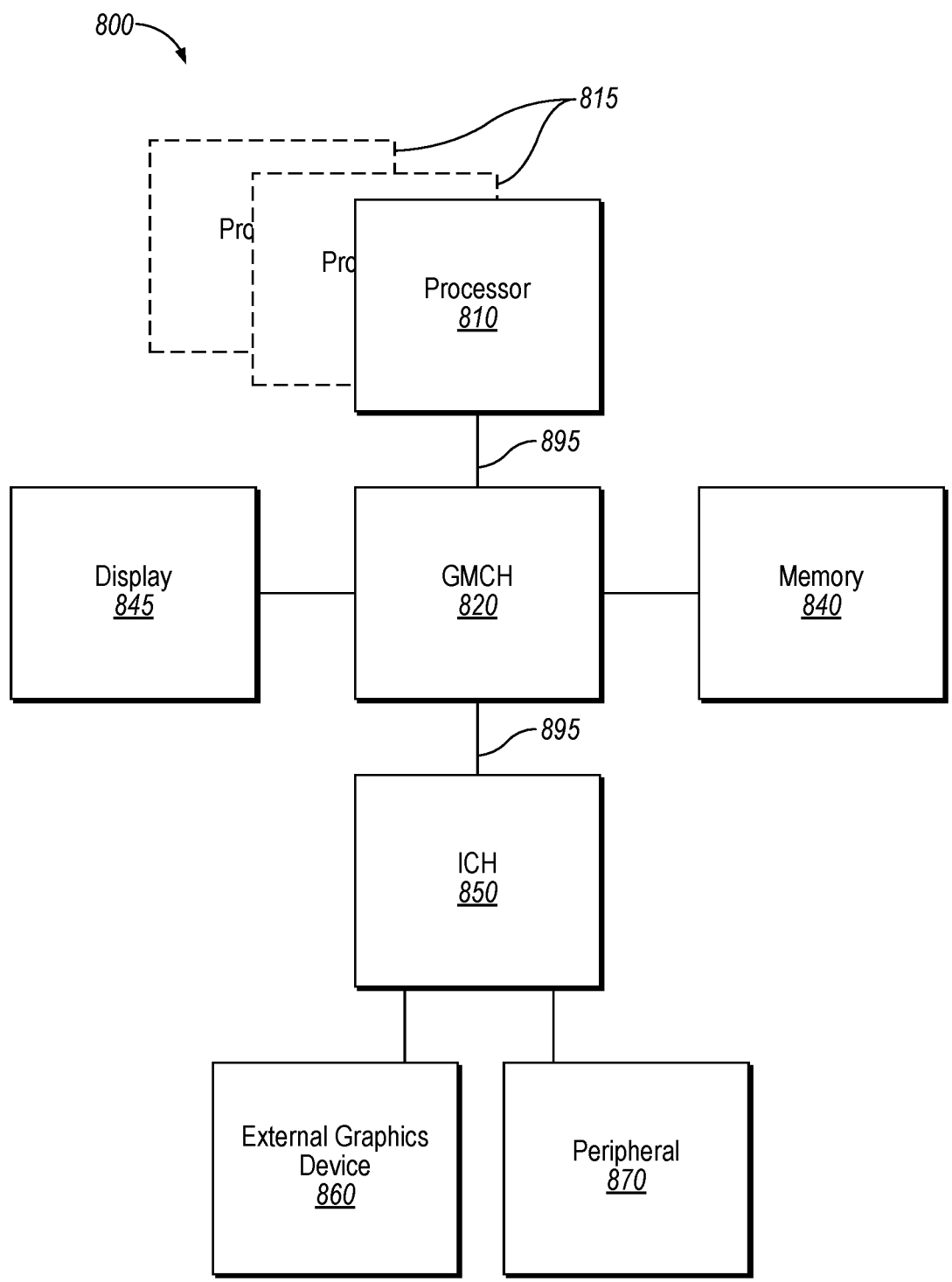
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
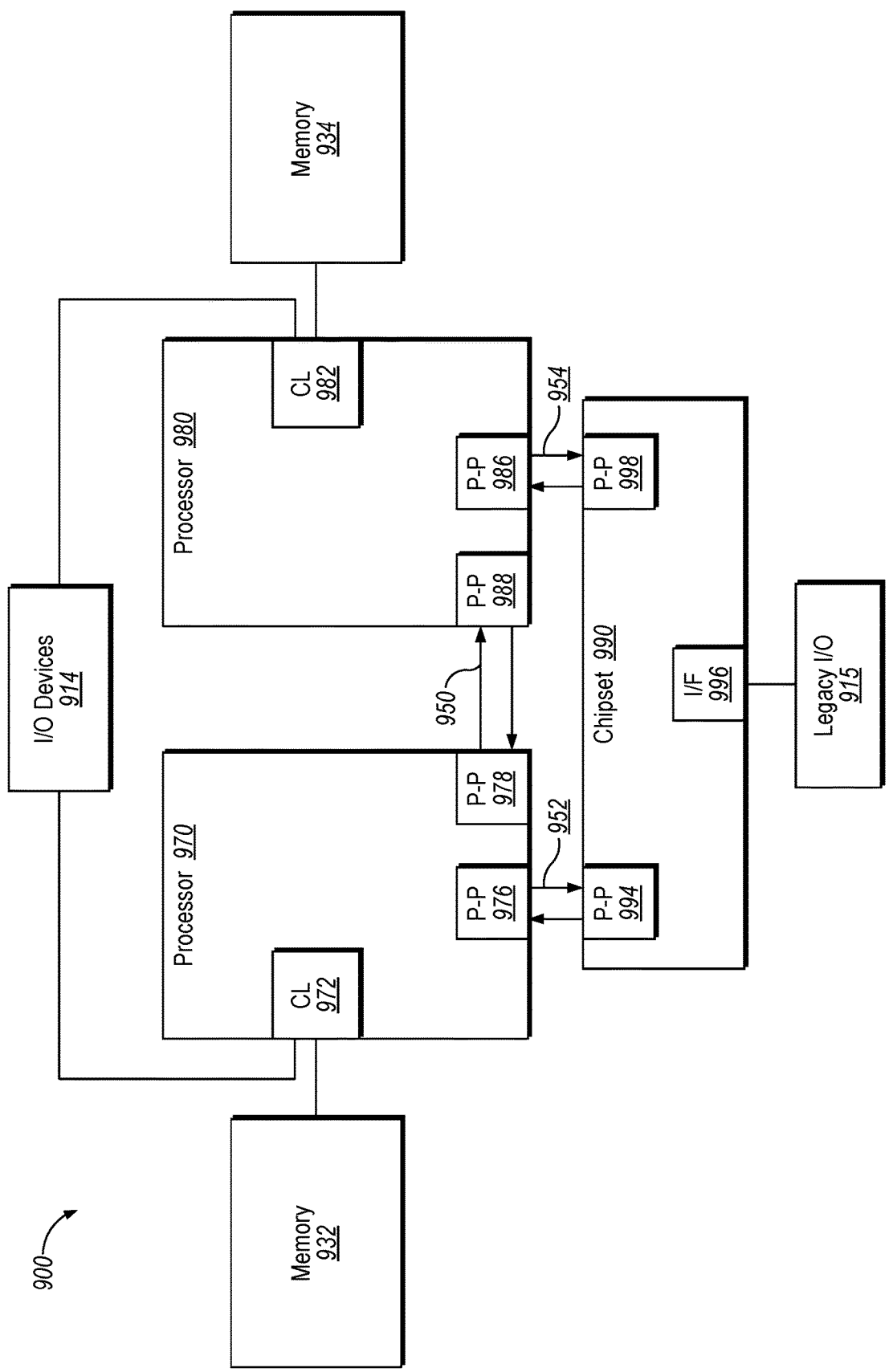
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
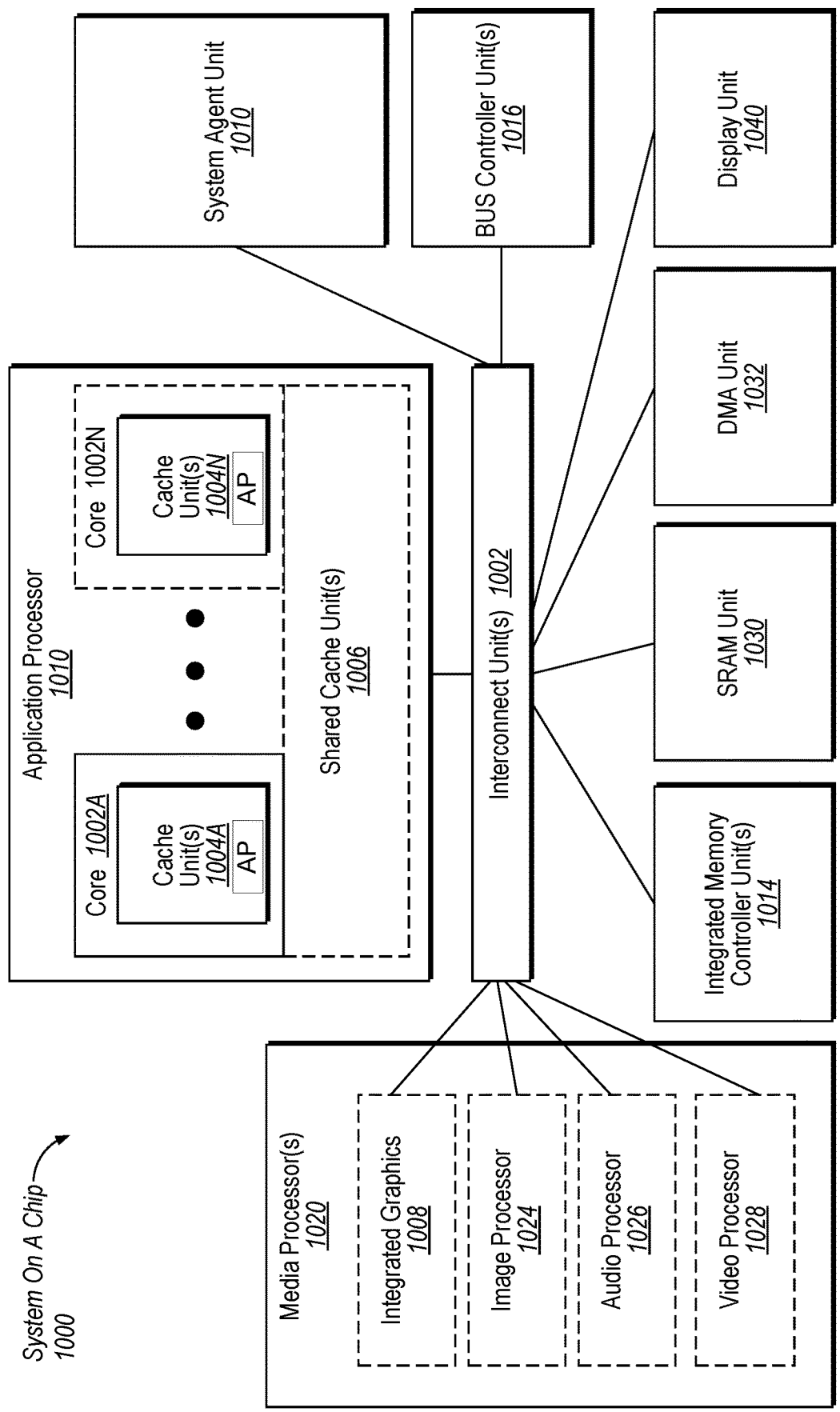
FIG. 10 is a block diagram of a System-on-a-Chip (SoC) in accordance with an embodiment of the present disclosure.

Embodiments may be implemented in many different system types. FIG. 10 is a block diagram of a SoC 1000 in accordance with an embodiment of the present disclosure. Dashed lined boxes are optional features on more advanced SoCs. In some implementations, SoC 1000 as shown in FIG. 10 includes features of the SoC 100 as shown in FIG. 1. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
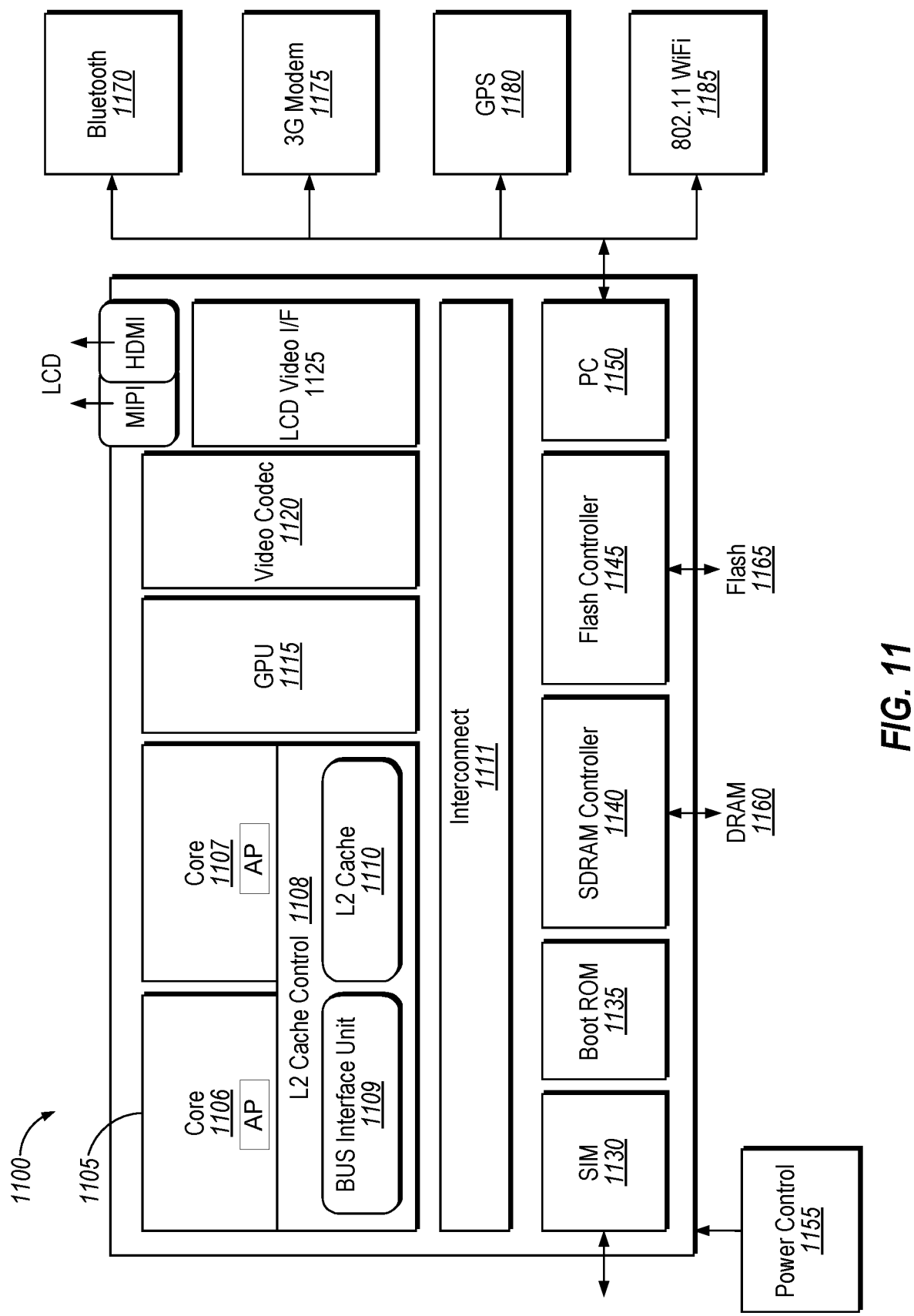
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
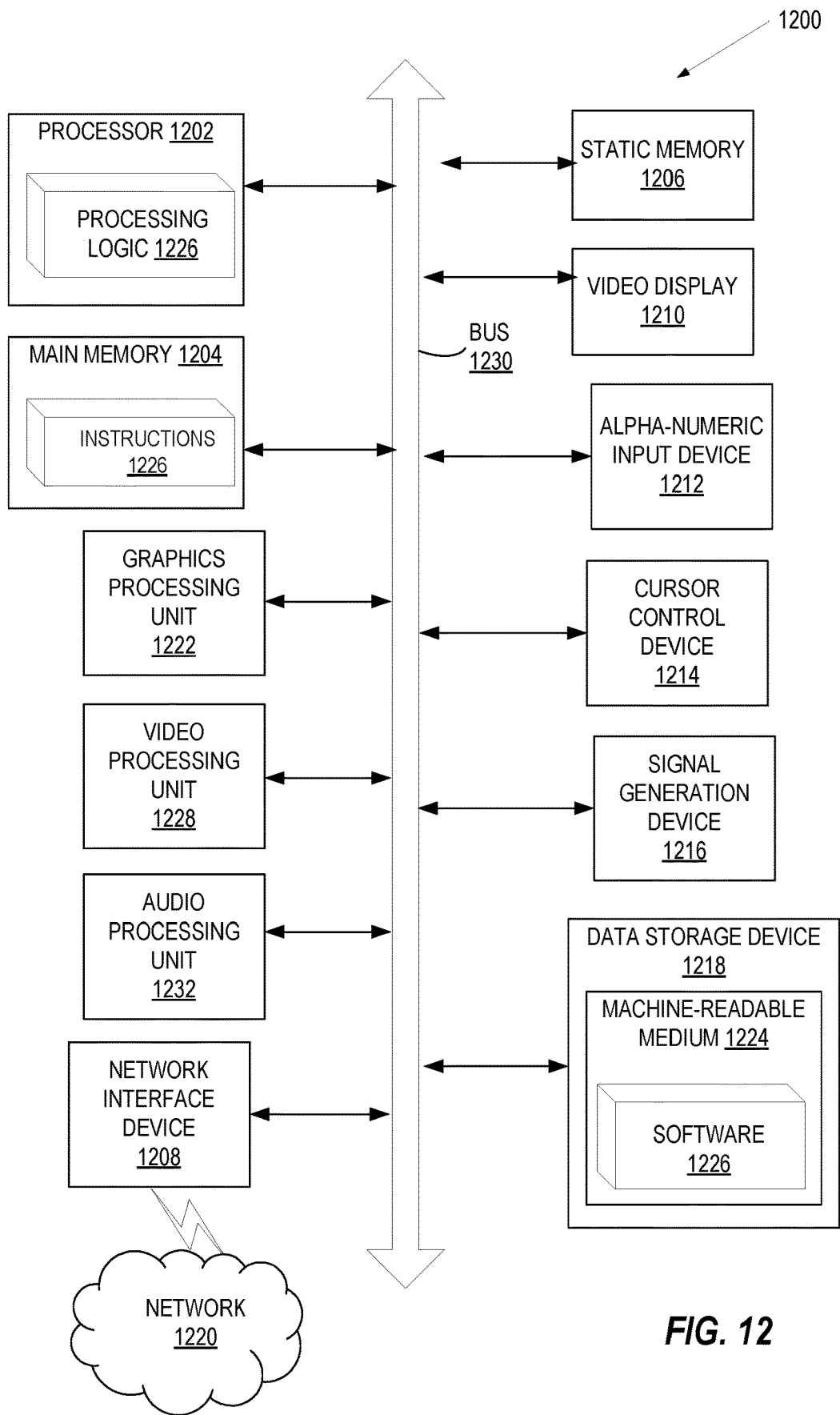
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or more processing cores. The processing device 1202 is configured to execute the processing logic 1226 for performing the operations and steps discussed herein. For example, processing logic 1226 may perform operations as described in FIG. 4. In one embodiment, processing device 1202 is the same as processor architecture 102 described with respect to FIG. 1 as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processor including an execution unit, an instruction scheduler circuit to identify a first instruction from an instruction stream, identify a second instruction on which execution of the first instruction depends, and assign a first dispatch priority value to the first instruction and the second instruction, and a dispatch circuit to dispatch, based on the first dispatch priority value, the first instruction and the second instruction to an instruction execution circuit.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner Note as above that use of 'to,' 'capable of/to,' and/or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor, comprising:
an execution circuit;
an instruction scheduler circuit to:
identify a first instruction of an instruction stream via construction of a bitmap table, wherein the bitmap table comprises:
a plurality of rows, wherein each row of the plurality of rows represents a source register;
a plurality of columns, wherein each column of the plurality of columns represents an instruction received by the instruction scheduler circuit; and
a plurality of cells comprising a first cell identified by a corresponding row and a corresponding column, the first cell to store a logical value indicating that the first instruction represented by the corresponding column references a first source register represented by the corresponding row, wherein the first source register is to receive an input value for the first instruction;
identify a second instruction on which execution of the first instruction depends via identification of the logical value in a second cell that precedes the first cell in order of execution along the corresponding row; and
assign a first dispatch priority value to the first instruction and to the second instruction; and
a dispatch circuit to dispatch, based on the first dispatch priority value, the first instruction and the second instruction to the execution circuit.

2. The processor of claim 1, wherein the instruction scheduler circuit is to identify the first instruction as a critical instruction that causes an execution latency that exceeds a pre-determined period of time, and wherein the critical instruction is one of a branch instruction or a load instruction.

3. The processor of claim 1, wherein the instruction scheduler circuit is further to, prior to identifying the first instruction, identify the second instruction as a non-critical instruction and assign a second dispatch priority value to the second instruction, wherein the second dispatch priority value is lower than the first dispatch priority value.

4. The processor of claim 1, further comprising a reserve station, associated with the dispatch circuit, to store a plurality of instructions to be dispatched, wherein the instruction scheduler circuit is further to:
responsive to identifying the first instruction, determine a first time of receiving the first instruction by the instruction scheduler circuit;
assign the first time as a first age value to the first instruction; and
store the first instruction in the reserve station.

5. The processor of claim 4, wherein the instruction scheduler circuit is further to:
identify a third instruction of the instruction stream;
assign the third instruction the first dispatch priority value;
determine a third time of the third instruction received by the instruction scheduler circuit; and
assign the third time as a third age value to the third instruction,
wherein responsive to determining that the third age value is greater than the first age value, dispatch the third instruction to the execution circuit prior to dispatching the first instruction.

6. The processor of claim 4, wherein the instruction scheduler circuit is further to assign the first dispatch priority value to a fourth instruction responsive to determining that the fourth instruction in the reserve station is associated with a second dispatch priority value that is lower than the first dispatch priority value and that the fourth instruction is associated with a fourth age value exceeding a pre-determined value.

7. The processor of claim 1, wherein the instruction scheduler circuit is further to:
identify instructions on which the execution of the first instruction depends, wherein the instructions are in a reserve station; and
assign the first dispatch priority value to the instructions.

8. The processor of claim 1, wherein the execution circuit comprises:
a first execution unit to execute instructions with the first dispatch priority value; and
a second execution unit to execute instructions with a second dispatch priority value, wherein the dispatch circuit is to dispatch the second instruction to the second execution unit prior to dispatching the first instruction to the first execution unit.

9. A system comprising:
a memory to store an instruction stream; and
a processor, communicatively coupled to the memory, comprising:
an execution circuit;
an instruction scheduler circuit to:
identify a first instruction of the instruction stream via construction of a bitmap table, wherein the bitmap table comprises:
a plurality of columns, wherein each column of the plurality of columns represents a source register;
a plurality of rows, wherein each row of the plurality of rows represents an instruction received by the instruction scheduler circuit and
a plurality of cells comprising a first cell identified by a corresponding column and a corresponding row, the first cell to store a logical value indicating that the first instruction represented by the corresponding row references a first source register represented by the corresponding column, wherein the first source register is to receive an input value for the first instruction;
identify a second instruction on which execution of the first instruction depends via identification of the logical value in a second cell that precedes the first cell in order of execution along the corresponding column; and
assign a first dispatch priority value to the first instruction and to the second instruction; and
a dispatch circuit to dispatch, based on the first dispatch priority value, the first instruction and the second instruction to the execution circuit.

10. The system of claim 9, wherein the instruction scheduler circuit is to identify the first instruction as a critical instruction that causes an execution latency that exceeds a pre-determined period of time, and wherein the critical instruction is one of a branch instruction or a load instruction.

11. The system of claim 9, wherein the instruction scheduler circuit is further to, prior to identifying the first instruction, identify the second instruction as a non-critical instruction and assign a second dispatch priority value to the second instruction, wherein the second dispatch priority value is lower than the first dispatch priority value.

12. The system of claim 9, wherein the processor further comprises a reserve station, associated with the dispatch circuit, to store a plurality of instructions to be dispatched, wherein the instruction scheduler circuit is further to:
responsive to identifying the first instruction, determine a first time of the first instruction received by the instruction scheduler circuit;
assign the first time as a first age value to the first instruction; and
store the first instruction in the reserve station.

13. The system of claim 12, wherein the instruction scheduler circuit is further to:
identify a third instruction of the instruction stream;
assign the third instruction a first dispatch priority value;
determine a third time of the third instruction received by the instruction scheduler circuit; and
assign the third time as a third age value to the third instruction,
wherein responsive to determining that the third age value is greater than the first age value, dispatch the third instruction to the execution circuit prior to dispatching the first instruction.

14. The system of claim 12, wherein the instruction scheduler circuit is further to assign the first dispatch priority value to a fourth instruction responsive to determining that the fourth instruction in the reserve station is associated with a second dispatch priority value that is lower than the first dispatch priority value and that the fourth instruction is associated with a fourth age value exceeding a pre-determined value.

15. The system of claim 9, wherein the instruction scheduler circuit is further to:
identify instructions on which the execution of the first instruction depends, wherein the instructions are in a reserve station; and
assign the first dispatch priority value to the instructions.

16. The system of claim 15, wherein the execution circuit comprises:
a first execution unit to execute instructions with the first dispatch priority value; and
a second execution unit to execute instructions with a second dispatch priority value, wherein the dispatch circuit is to dispatch the second instruction to the second execution unit prior to dispatching the first instruction to the first execution unit.

17. A method comprising:
identifying a first instruction of an instruction stream of a processor via construction of a bitmap table, wherein the bitmap table comprises:
a plurality of rows, wherein each row of the plurality of rows represents a source register of the processor;
a plurality of columns, wherein each column of the plurality of columns represents an instruction received by an instruction scheduler circuit; and
a plurality of cells comprising a first cell identified by a corresponding row and a corresponding column, the first cell to store a logical value indicating that the first instruction represented by the corresponding column references a first source register represented by the corresponding row, wherein the first source register is to receive an input value for the first instruction;
identifying a second instruction on which execution of the first instruction depends via identification of the logical value in a second cell that precedes the first cell in order of execution along the corresponding row;
assigning a first dispatch priority value to the first instruction and to the second instruction; and
dispatching, based on the first dispatch priority value, the first instruction and the second instruction to an execution circuit.

18. The method of claim 17, further comprising identifying the first instruction as a critical instruction that causes an execution latency that exceeds a pre-determined period of time, wherein the critical instruction is one of a branch instruction or a load instruction.

19. The method of claim 17, further comprising, prior to identifying the first instruction:
identifying the second instruction as a non-critical instruction; and
assigning a second dispatch priority value to the second instruction, wherein the second dispatch priority value is lower than the first dispatch priority value.

20. The method of claim 17, further comprising:
responsive to identifying the first instruction, determining a first time of receiving the first instruction by the instruction scheduler circuit;
assigning the first time as a first age value to the first instruction; and
storing the first instruction in a reserve station comprising a pool of a plurality of instructions waiting to be dispatched.

* * * * *